March 31, 1964  J. H. F. KENT  3,127,297
TYRE RE-TREADING EQUIPMENT
Filed Nov. 4, 1960  8 Sheets-Sheet 1

Fig. 1.

Inventor: Jan Herbert Farquharson Kent
By Baldwin & Wight, Attorneys

March 31, 1964    J. H. F. KENT    3,127,297
TYRE RE-TREADING EQUIPMENT
Filed Nov. 4, 1960    8 Sheets-Sheet 2

Inventor: Jan Herbert Farquharson Kent
By Baldwin & Wight, attorneys

United States Patent Office 3,127,297
Patented Mar. 31, 1964

3,127,297
TYRE RE-TREADING EQUIPMENT
Jan Herbert Farquharson Kent, Jersey, Channel Islands, assignor to Kentredder Limited, Helier, Jersey, Channel Islands, a corporation of Jersey, Channel Islands
Filed Nov. 4, 1960, Ser. No. 67,327
Claims priority, application Great Britain Nov. 12, 1959
12 Claims. (Cl. 156—394)

This invention relates to apparatus for retreading of tyres.

Present day practice in retreading tyres is to apply to the worn tread of the outer cover or carcase of the tyre a new tread band and then to place the cover or carcase with the new tread attached in a mould where it is subjected to the necessary heat and pressure to vulcanise the tread to the cover or carcase.

In my prior British specification No. 732,241 there is described a method of attaching to the tread of a worn tyre a tread band by a moulding operation where, instead of the tread band being applied to the tyre, it is first placed in the mould, following which, the outer cover or carcase, the worn tread of which has previously been trued up by means such as a buffing machine, is transferred to the vulcanising mould, in which the tread band is already in position.

The present invention is concerned with an improved method and apparatus for retreading a tyre in which the whole method including the buffing operation and the act of transferring the tyre from the buffing machine to the mould can be operated by a single man.

According to the present invention a method of retreading the outer cover of a tyre comprises the steps of spreading apart the walls of the outer cover to produce a flat tread condition preparatory to buffing, subjecting the tyre with the tread in this condition to a buffing operation and following the buffing operation, with the tyre still in the spread condition, transferring it directly from the spreader to an annular curing matrix or mould containing a new tread band so that on releasing the tyre from the spreader it will bring about the interengagement of the tyre with the tread band.

According to a further feature of the invention apparatus for use in retreading a tyre comprises a ground stand having support means by which a tyre to be retreaded can be mounted for rotation about a substantially horizontal axis, a spreader device associated with the support means to enable the walls of the outer cover, when in position thereon, to be displaced to reduce the tread diameter, buffing means on the ground stand by which the tread is trimmed and from which support means the outer cover can be transferred directly, without releasing its spread condition, to a tyre matrix or mould and the spreader device operated to allow the pressure exerted through the walls on release by the spreader device, to produce interengagement of the tread with the tread band.

The invention is illustrated in the accompanying drawings in which:

FIGURE 8 is a side elevation in the direction of the arrow VI of FIGURE 6.

FIGURE 8$^A$ is a schematic view of a part of a valved hydraulic circuit for operating a hydraulic ram and associated tyre spreader.

Figure 1:
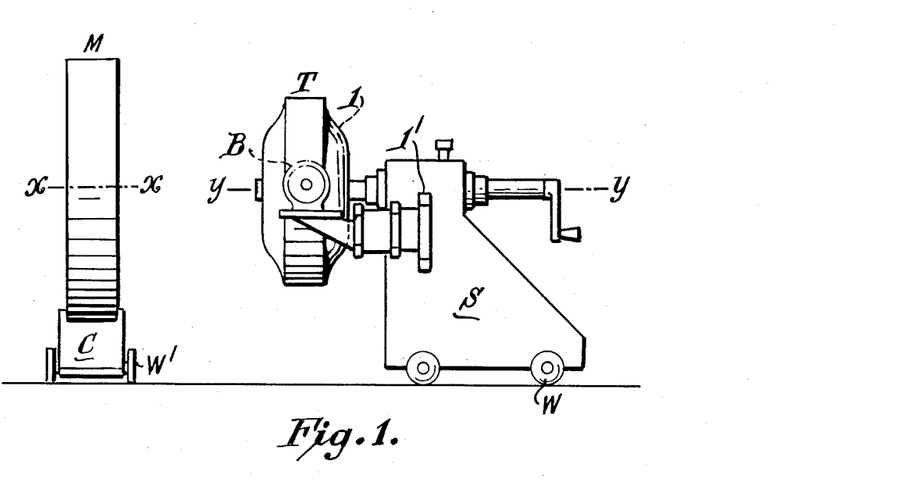
FIGURE 1 is a diagrammatic composite view of a tyre retreading apparatus embodying a ground stand having a buffing machine and support means for the tyre and a mould or matrix support carried by an independent ground stand to receive the tyre.

Referring first to FIGURE 1 of the drawings the apparatus comprises a ground stand or carriage S provided with wheels or castors W. On the stand is tyre support means indicated generally at 1, by which the tyre to be retreaded can be supported in a vertical position, its axis y—y being horizontal. The support means incorporates a spreader device to enable the walls of the outer cover to be moved apart from one another to produce a flat condition of the tread, which is necessary when trimming surplus rubber from the tread preparatory to buffing. T indicates a tyre in position.

Also mounted on the stand S is a buffing mechanism, the buffing mechanism being shown in dotted lines at B and including a revolving disc type rasp driven by an electric motor, the whole of which is carried by a swinging bracket, which swings about a vertical pivot 1' on the side of the stand so that it can be moved into and out of its operative position. C indicates an independent carriage, also mounted on ground wheels W', this carriage having means by which a tyre mould, indicated generally at M, can be mounted vertically with its axis x—x in horizontal alignment with the axis y—y of the tyre when positioned on the support means.

Figure 2:
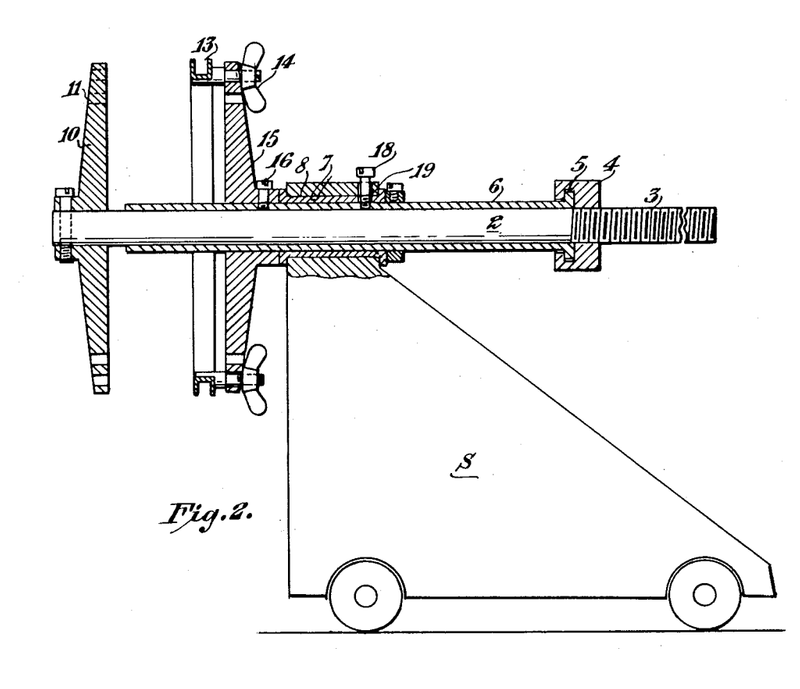
FIGURE 2 is a sectional elevation on an enlarged scale of the stand and tyre spreading device as shown in FIGURE 1.
Figure 2A:
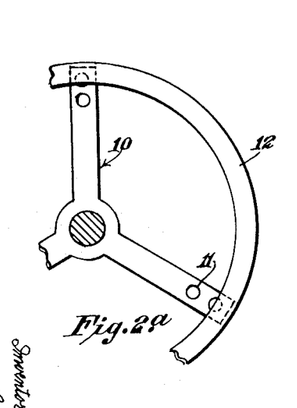
FIGURE 2a is a detail view of a ring for mounting the tyre on the spreading device.

Referring also to FIGURE 2 the tyre support means comprises a horizontally mounted spindle 2, which has a threaded end portion 3 to engage a threaded control collar or nut 4 carried by a flange 5 on one end of a sleeve 6, which sleeve 6 in turn, is rotatably mounted in a bush 7 in a horizontal bore 8 in the head of the stand S. Fast on the outer end of the spindle 2 is a spider 10 having radial arms in the outer ends of which are a series of spaced holes 11 for attachment thereto of tyre wall or bead engaging rings 12 of different diameters. For co-operation with the selected ring 12, there is provided a second channel-section ring 13 of selected diameter, detachably secured by wing nuts 14 to a disc (or arms) 15 secured to the sleeve 6 by means of a set screw 16.

It will be appreciated that the parts 12 and 13 provide support means for the outer cover of a tyre and in practice one bead or wall of the tyre is engaged on its inside by the ring 13, the other ring 12 serving to engage the opposite bead or wall of the tyre.

In order to increase or decrease the axial separation between the rings 12 and 13, the nut is turned on the spindle 2. Provision is made to lock the sleeve 6 against rotation and for this purpose there is provided a lock pin 18, having a screwed end for engagement with a threaded hole 19 in the sleeve 6, access to which is through enlarged holes respectively in the bush 7 and head 8.

It will be appreciated that when the lock pin 18 is in position the sleeve 6 will be held against rotation and therefore by turning the nut 4 which is done by hand, the spindle 2 can be moved in an axial direction in order to increase or decrease the separation between the spider 10 mounting the ring 12 and the disc 15 mounting the ring 13. During the buffing operation when the rasp is brought into operation, the lock pin 18 is withdrawn when the entire assembly will be free to revolve within the bush 7. With this arrangement the buffing action is by means of teeth on a rasp disc whose diameter exceeds that of the width of the tread area to be buffed. The disc is mounted to revolve in a plane or planes which is or are substantially tangential to the tread of the tyre at the point of contact, means being provided to maintain the tyre in a position which is offset with respect to the centre of rotation of the teeth on the disc whereby the teeth, in addition to their cutting action on the tread, will impart a rotational thrust on the tread causing it to revolve.

Referring now to FIGURES 5–8 which illustrate a preferred embodiment of the invention, the ground stand comprises a rectangular frame made up of longitudinal members 15' and end members 16' provided at each of its four corners with screw jacks 17' so that, in operation, the stand and equipment thereon can be raised to a position where the ground wheels 18' and a castor 18" are clear of the ground. A cross bar 19' has secured thereto an upright bracket 20 which, together with a post 21, carries the tyre support means, indicated generally at D, a hydraulic plunger and cylinder device generally designated H and the buffing device B.

The hydraulic plunger and cylinder device H as hereinafter described provides for mechanical control of the spreader and is alternative to the manual screw operated mechanism shown in FIGURE 2.

Figures 8, 8A:
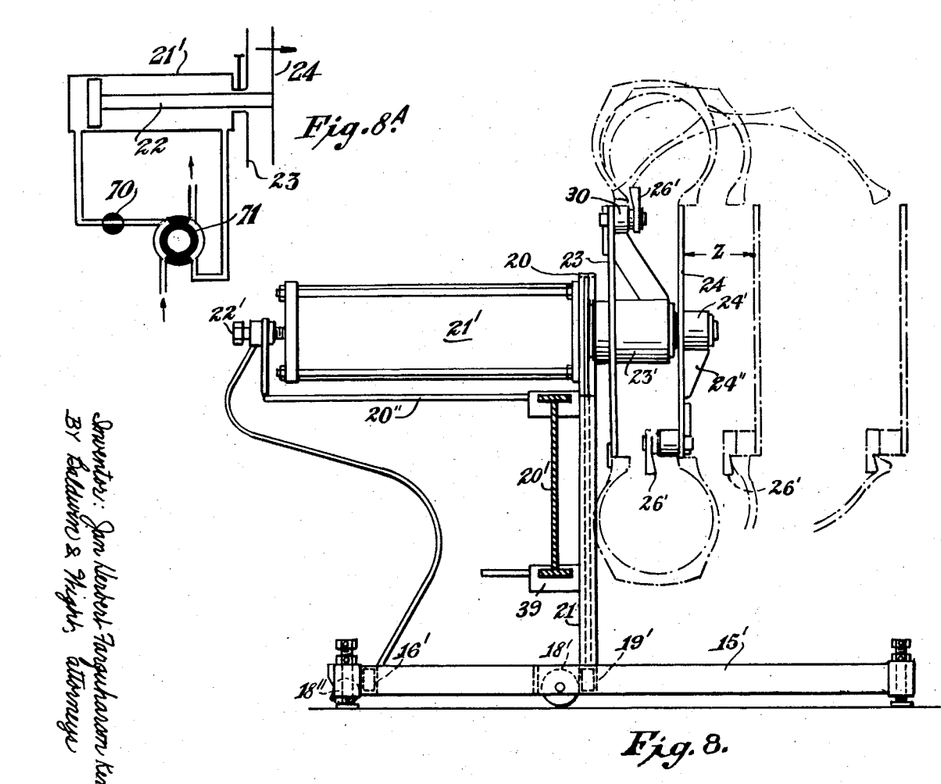

As can be seen from FIGURE 8, the bracket 20 has attached to one side thereof an I-section bracket 20' which, in conjunction, with the main bracket 20, provides a rigid support for the hydraulic cylinder 21' of the plunger and cylinder device H. The cylinder 21' mounts a ram plunger, indicated generally at 22. The provision of an end support 20" on the bracket 20 and an adjustable screw 22' ensures that the overhang of the cylinder and piston is fully supported.

Figure 10:
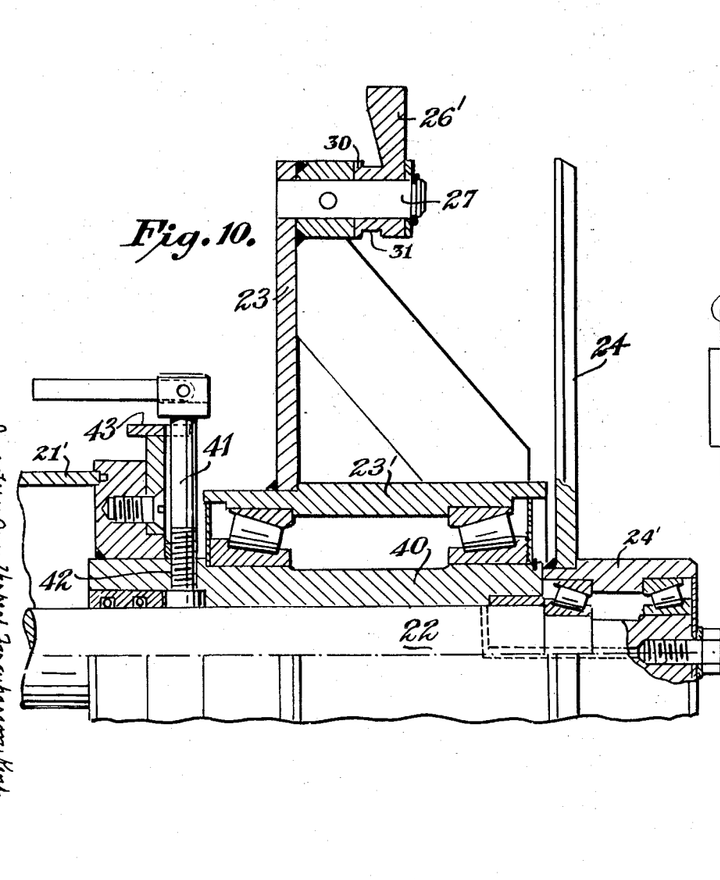
FIGURE 10 is a detail sectional view showing the end of an hydraulic ram and the stationary and movable tyre spreading disc arms.
Figure 11:
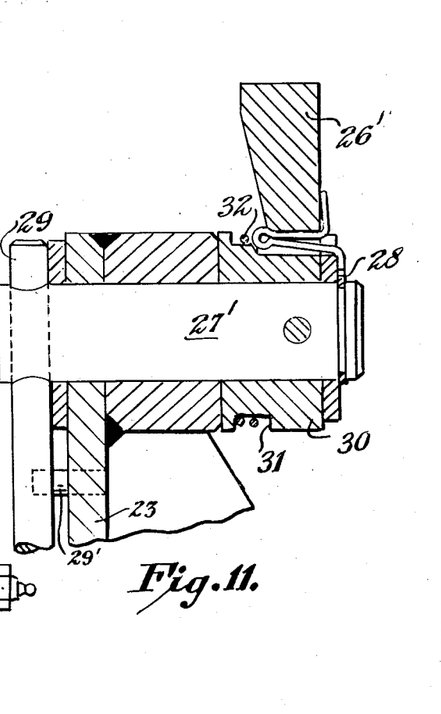
FIGURE 11 is a detail section showing one of a plurality of claw devices attached to the outer ends of the stationary and movable discs of the tyre spreader.

Discs 23, 24 are respectively fast with a collar 23' antifrictionally journaled on a sleeve 40 on the end of the ram cylinder 21' and a hub 24' antifrictionally journaled on the ram plunger 22 and having ribs 24" which stiffen the joint between the disc 24 and hub 24'. The discs 23, 24 constitute the support means for the tyre and, to enable a tyre to be positioned thereon, each disc is provided with four circumferentially spaced claws 26'. Three of the claws 26' on each disc are freely mounted respectively on spindles 27 as shown in FIGURE 10 so as to be capable of angular displacement thereon, whilst the fourth claw 26' on each disc is secured by means of a circlip device 28 to one end of its spindle 27' as shown in FIGURE 11, the spindle 27' at its other end being provided with an operating key or handle 29. Conveniently, stop pins 29' are provided to limit the movements of the handles 29 so that the claws 26' can readily be moved by the operator to their extended or retracted positions in the profile of the disc.

Figure 7:
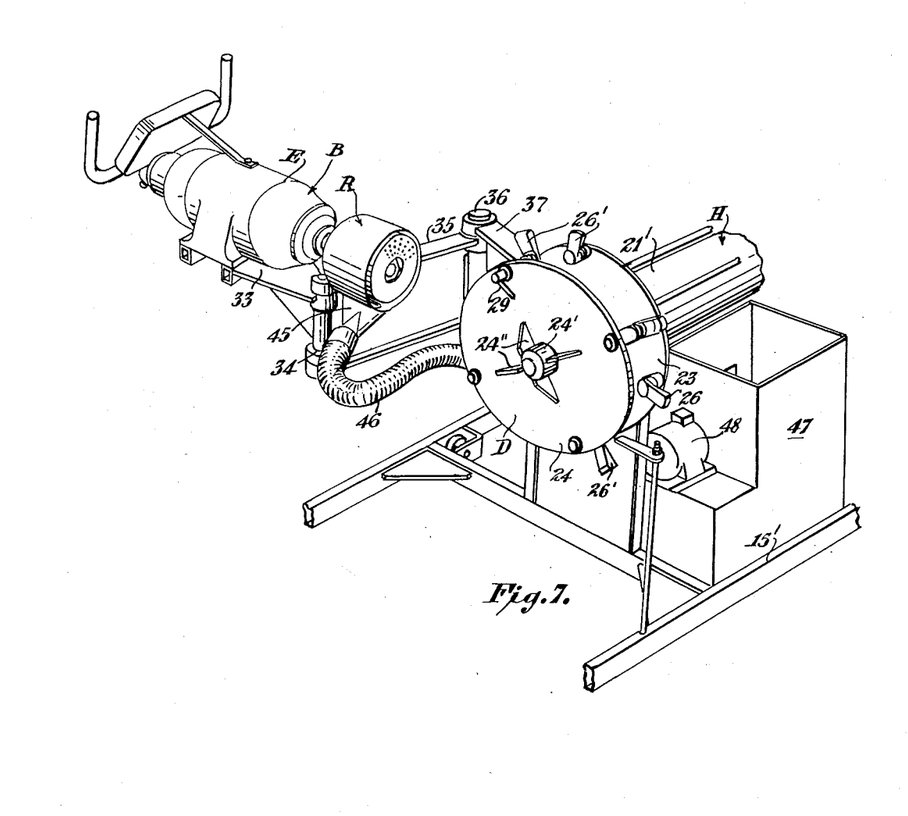
FIGURE 7 is a perspective view of the ground stand and tyre support means of FIGURES 4 and 5 showing a suction operated dust extractor which is used in conjunction with the buffing mechanism.

Each of the four claws 26' is integral with a hub 30 having a peripheral groove 31 to receive an endless operating cable 32. By looping the cable 32 twice around all the hubs 30, and in the grooves 31, rotation of the spindle 27' by the hand key 29 will produce a corresponding movement of all four claws 26' on the associated disc about their respective spindles 27' and 27 so that the claws can be swung from an inwards or inoperative position where they lie inside the perimeter of their respective discs 23, 24 to an operative and extended position as shown in FIGURE 7.

Figures 3, 4:
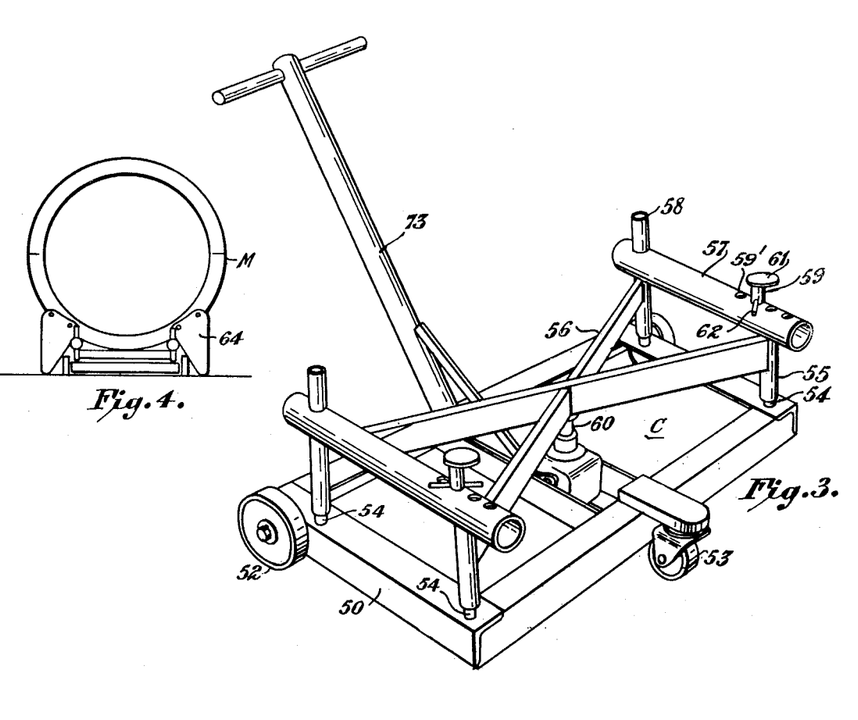
FIGURE 3 is a perspective view of a trolley adapted to receive a mould support for use with the apparatus of this invention.
FIGURE 4 is an end-on view on a reduced scale of the trolley shown in FIGURE 2 with a tyre mould in position thereon.

In operation, therefore, when it is desired to mount a tyre on the support means including the two discs 23, 24 the claws 26' are turned inwardly so that there is sufficient clearance for the tyre beads to pass over the two discs. Once the tyre is in position the claws are restored to the FIGURE 7 position. Where the buffing head is composed of two discs etc. carrying rotatable claws as shown in FIGURES 7, 8, 10, and 11, only one bead diameter can be handled without changing the disc elements 23, 24. On the other hand, the procedure of first attaching bead support rims 12 and 13, as shown in FIGURES 2 and 3, to the tyre and then mounting these rims on the discs or spiders has the merit that tyres of different bead diameters can be handled on the same spreading device if holes arranged at different diameters are provided in the discs or spiders.

Admitting pressure to the cylinder 21' of the hydraulic device H, effects an axial displacement of the ram plunger 22 and its associated disc 24 as indicated at Z in FIGURE 8, which enables the distance between the beads to be increased until such time as the tread has been brought into a flat condition preparatory to buffing.

The buffing unit including the electric motor E and rasp R is mounted on a horizontal bracket 33, which is carried by a vertical hinge pin 34, in turn carried by arms 35 which are connected by a hinge pin 36 to arms 37 on a hinge pin 38 secured in lugs 39 on the rear side of the post 21.

Figure 5:
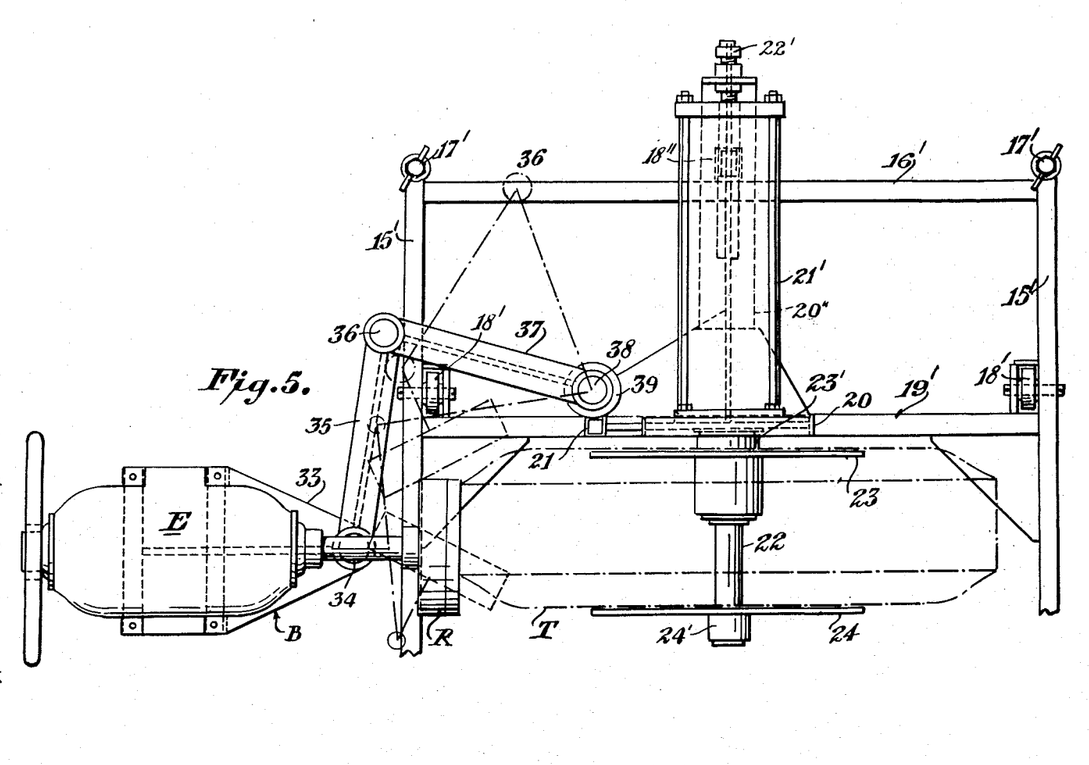
FIGURE 5 is a plan view of the buffing machine unit showing the tyre support means and buffing mechanism, said support means incorporating a tyre spreading device.
Figures 6, 9:
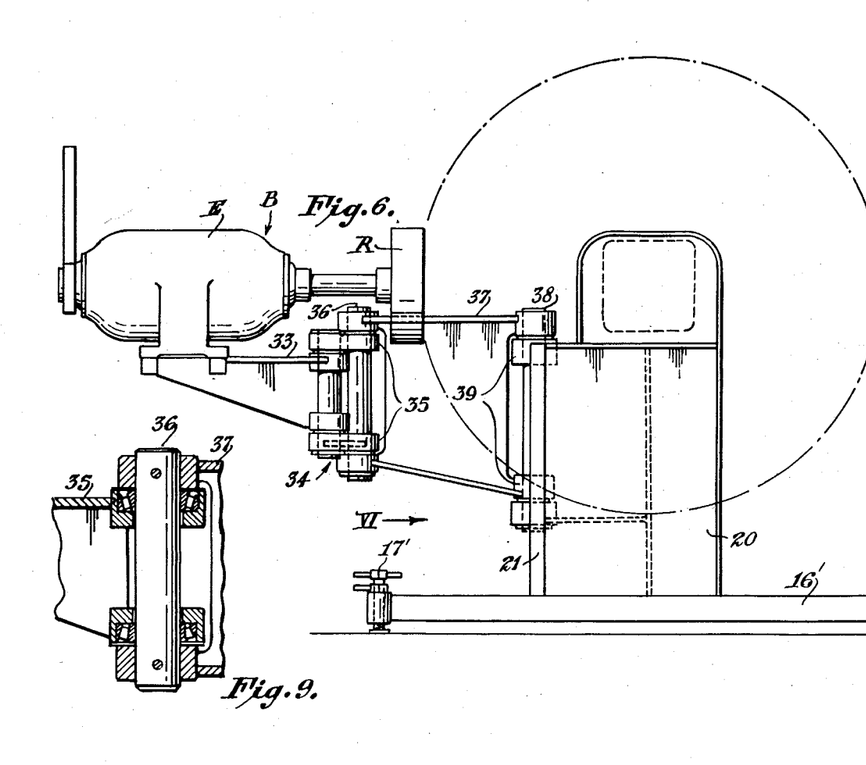
FIGURE 6 is an end-on elevation of FIGURE 5 with the tyre spreader and support means omitted, the outline of the tyre being shown in dot and dash lines.
FIGURE 9 is a detail section.

As indicated by the dot and dash lines in FIGURE 5, the bracket 33 mounting the buffing machine motor together with the rasp can be swung to an out of action position where the hinge pin 36 occupies the position shown in dot-dash lines. The buffing mechanism B will then be disposed to one side of and to the rear of the tyre which is still supported on the spreader discs 23 and 24.

Referring now to FIGURE 10, it will be seen that the inner disc 23 is fast with the collar 23' which is rotatably mounted by means of taper roller bearings on the inner sleeve 40, this sleeve being rotatably carried on the outer end of the cylinder 21'.

To prevent any possibility of the ram "creeping" during a buffing operation, there is provided a stop pin 41 having a screw threaded end for engagement with a threaded hole 42 at the inner end of the sleeve; this stop pin 41, when in its operative position engaging and holding the ram against movement. The stop pin is received in a forked part 43 fast on the end of the cylinder. It will be seen that both discs 23, 24 are mounted to revolve by means of bearings, the buffing procedure being the same and making use of a rasp R, i.e., a toother disc as described above.

Control of the hydraulic or other pressure circuit of the operating cylinder 21 and ram is preferably by means of a four-way valve 71 (see FIGURE 8A) of the rotary type having three positions e.g. contract-neutral-expand. In addition a pressure release or lock needle valve 70 is fitted so that a hydraulic or pneumatic lock of the tyre spreader is possible.

Provision may be made to fit a dust control unit or extractor so that rubber particles removed by the rasp are sucked up. The extractor consists of a nozzle 45 (see FIGURE 7) which is connected through a length of flexible hosing 46 to a chamber 47 which can be placed under reduced pressure by means of a motor driven fan, indicated generally at 48, or by stub fan blades fixed to the periphery of the buffing disc.

Referring now to FIGURE 3, the support stand C for the tyre matrix or mould consists of a rectangular frame 50 built up of angle section strip which is mounted on rollers 52 at one side and a central castor 53. Adjacent the four corners of the main frame 50 are vertical posts 54 with which sockets 55, forming part of a subsidiary X-shape frame 56, are slidably engaged. The ends of the secondary frame 56 are provided by tubular bars 57, each of these bars 57 having a fixed stop 58 at one end and an adjustable stop pin 59 at the other for engagement with one or other of a series of holes 59′ in the opposite end of the bar 57. The adjustable stop 59 comprises an eccentric head 61 so that by turning a lever arm 62 on each pin, the head 61 can be moved to a position where the eccentric portion interlocks with a matrix when placed thereon. By fitting a hydraulic jack 60 on the main carriage it is possible to raise and lower the auxiliary frame 56 mechanically, control of the jack conveniently being through linkage under the control of the trolley towing handle 73.

In FIGURE 4 the matrix M is shown in position and which, when being transported, is secured by adjustment of the stops 61 as described above. It will be seen that the matrix or mould M is provided on opposite sides with pairs of ground engaging legs 64 so that when the tyre has been transferred from the tyre support discs 23, 24 to the matrix, the latter when lowered to the ground will remain upright on its legs.

In operation the buffing head and buffing motor are withdrawn to the dotted line position shown in FIGURE 5 and at the same time the claws on the tyre supported discs are retracted, the claws on the front disc 24 being offset at an angle of 45° to those on the rear disc.

An air bag having been inserted in the tyre, the latter is mounted on the back disc 23 and the tyre is pushed against the rear disc so as to ensure that the rearmost bead has passed beyond the plane of the claws 26′. The front disc 24 is moved toward the rear disc 23 until the claws 26′ on the disc 24 have passed within the frontmost bead of the tyre. The handles 29 are now operated to bring both sets of claws on the two discs 23, 24 into the spreading position where they engage the beads. Having ensured that the needle valve 70 is in the open position, the rotary valve 71 is operated to admit pressure to the cylinder 21 in order to partially spread the tyre and flatten the tread. Having spread the tread, the valve 71 is returned to neutral and the needle valve 70 closed. Following this, the stop pin 41 is screwed into the hole 42 in the sleeve 40 in a direction to engage the plunger 22 in order mechanically to hold the tyre against relaxation.

The buffing operation can now be carried out by swinging the bracket 33, which carries the buffing motor E, into the full line position shown in FIGURE 5. On completion of the buffing operation, the entire buffing mechanism is swung rearwardly away from the tyre until the parts assume the dot and dash line position of FIGURE 5.

Preparatory to transferring the tyre T from its position on the supports discs 23, 24 to the matrix or mould M, the new length, i.e., strip or band of rubber tread is placed in the matrix or alternatively the ends of the tread strip are spliced together or otherwise formed into a ring and the ring placed on the flattened tread of the tyre.

With the tread band in position (either in the matrix itself or on the tyre), the trolley 50, 57 together with the matrix M thereon is wheeled into a position to bring the central axis x—x of the matrix into alignment with the axis y—y of the support means as shown in FIGURE 1.

Before transferring the tyre to the matrix M it is necessary to ensure that the tyre is fully spread. This involves withdrawing the stop pin 41, opening the needle valve 70 and moving the rotary valve 71 to admit further pressure to the cylinder 21′. When the walls of the tyre have been fully expanded so as to reduce the tread diameter to a size which permits the tyre to enter the mould, the needle valve 70 is closed. To assist in obtaining alignment of the matrix M and the tyre, use is made of the hydraulic jack 60 supporting the frame 56, 57 and as a guide, reference lines may be provided on the side walls of the matrix, these being made to coincide with a light gauge on the trolley 15′—16′. The actual operation of transferring the tyre from the support discs 23, 24 becomes a simple operation due to the alignment of the components as described above.

When the tyre is inside the mould, the rotary valve 71 is opened to the position to move the ram in a direction to contract the discs 23, 24. Care should be taken to ensure that the relaxation of the tyre is gradual and for this reason the needle valve should be used.

When the buffing head has been fully retracted and the bead claws 26′ on both discs 23, 24 moved to their inoperative positions, it is then possible to draw the matrix M clear of the tyre support means and buffing head by drawing the trolley 50 away through its towing handle 73. When the trolley is clear the matrix M can be jacked down to floor level through the hydraulic jack in which position the legs 64 will be resting on the ground. It is now possible to move the trolley in readiness for a repetition of the sequence of operations just described.

What is claimed is:

1. Apparatus for use in retreading a tyre by attaching to the worn tread a new tread band, said apparatus comprising a ground stand having support means by which a tyre can be mounted for rotation about a substantially horizontal axis, said support means including a spreader device to enable the spreading of the walls of the outer cover to be adjusted as required, said spreader device including two members capable of relative axial displacement, each of said members having tyre engaging means, and means for operating the spreader device whereby, when a tyre is in position thereon, operation of the device enables the cross-section at the tread to be adjusted to produce a flat tread condition, and buffing means on the stand whereby the tread, when in a flat condition, can be trimmed preparatory to receiving the new tread band, and to enable, by controlled contraction of the tread, the outer cover to be transferred directly from the support means to a matrix or mould, the operation of releasing the tyre from the spreader device bringing about interengagement of the tyre and the tread band.

2. Apparatus for use in retreading tyres by attaching to the worn tread a new tread band, said apparatus comprising a ground stand, support means on the stand to receive a tyre to be retreaded which support means includes a spreading unit comprising two members mounted for relative horizontal movement and each having tyre wall engaging and supporting means operable upon relative separating movement of said members for spreading the tyre walls and thereby flattening the tyre tread, and buffing means mounted on the stand for movement into and out of engagement with the tread of the tyre, when in a flat condition, for trimming it preparatory to attachment thereto of a new tread band, the spreader device being capable of bodily movement so that, following the buffing operation, and movement of the buffing means out of engagement with the tyre, the latter can be moved into a curing matrix while still being supported on and spread by said two members.

3. Apparatus as claimed in claim 2 in which the buffing means is movably supported on the ground stand for movement to an operative position adjacent the spreader and to an inoperative position to one side of and relatively remote from the spreader.

4. Apparatus as claimed in claim 2 in which the spreading unit members respectively have fitted thereto tyre wall engaging parts of selected diameter for cooperating with tyres of different sizes.

5. Apparatus for use in retreading tyres by attaching to the worn tread a new tread band, said apparatus comprising a ground stand, support means on the stand to receive a tyre to be retreaded, said means comprising horizontally arranged rotatable relatively telescopic components having tyre wall engaging elements, by which a tyre, when mounted thereon, can be supported for rotation, means for effecting relative axial displacement of the said components in order to increase the separation of the tyre walls to produce a flat tread condition, normally inoperative buffing means including a power driven rotary rasp mounted on the stand for movement into and out of an operative position in which the rasp can engage the tread, the axis of rotation of the rasp being offset in relation to the plane of the tyre, so that the tyre is automatically rotated during the buffing operation on drive being transmitted to the rasp, movement of said buffing means out of its aforesaid operative position to an inoperative position relatively remote from a tyre on said components enabling the tyre, on completion of the buffing operation, to be transferred from the support means to a curing matrix.

6. Apparatus as claimed in claim 5 in which the buffing means comprises an electric motor and a rasp driven by the motor, a bracket on which the motor and rasp are supported, and means by which said bracket is hingedly mounted on the ground stand.

7. Apparatus as claimed in claim 6 in which the means by which the bracket is hingedly mounted on the ground stand comprises two hinged lever arms, whereby said buffing means can be withdrawn to a position where it lies behind the tyre supporting components.

8. Apparatus as claimed in claim 5 in which said components comprise two disc members each having a series of circumferentially spaced claws and in which the claws are hingedly mounted on the disc members so that they can be moved to an inoperative position within the perimeter of the discs and the tyre walls or expanded for engagement with the tyre walls.

9. Apparatus as claimed in claim 8 including, on each disc member, a spindle journaled on the disc member, one of said claws on the associated disc member being fixed to said spindle, means journaling the other claws for rotation on said associated disc member, and a drive cable operatively interconnecting the claws on said associated disc member whereby rotation of said spindle will simultaneously rotate said claws and move the latter to and from their operative positions.

10. Apparatus as claimed in claim 5 in which the means for effecting relative axial displacement of said components includes a hydraulic ram and cylinder device, said components being mounted respectively on the ram and cylinder.

11. Apparatus as claimed in claim 10 in which said cylinder is provided with an extension sleeve on which one of said components is rotatably mounted.

12. Apparatus as claimed in claim 10 comprising a mechanical locking device for maintaining said ram against movement, and, for operating said hydraulic ram device, a fluid pressure circuit comprising a three-way valve for controlling the movements of the ram, and a needle valve in the pressure line to said three-way valve to hold the ram hydraulically in its displaced position.

References Cited in the file of this patent

UNITED STATES PATENTS

| | | |
|---|---|---|
| 1,746,763 | Burdette | Feb. 11, 1930 |
| 1,851,555 | Wheeler | Mar. 29, 1932 |
| 1,908,311 | Branick | May 9, 1933 |
| 2,321,936 | Pollock | June 15, 1943 |
| 2,353,570 | Kraft | July 11, 1944 |
| 2,405,802 | Taber | Aug. 13, 1946 |
| 2,407,806 | Arnold et al. | Sept. 17, 1946 |
| 2,850,263 | Hawkinson | Sept. 12, 1958 |
| 2,888,065 | Neilsen | May 26, 1959 |
| 2,916,772 | McDonald | Dec. 15, 1959 |
| 2,928,119 | Fassero et al. | Mar. 15, 1960 |
| 2,944,283 | Lawson | July 12, 1960 |
| 2,986,196 | Frazier | May 30, 1961 |
| 3,005,619 | Bowen | Oct. 24, 1961 |

OTHER REFERENCES

Hawkinson Tire Tread Service, Inc., Minneapolis, Minn., Form A, pamphlet, copyright 1940, sheet 4.